March 22, 1949.  R. HAPPE ET AL  2,465,309
CHUCK ADAPTER FOR PORTABLE ELECTRIC TOOLS
Filed June 1, 1944  2 Sheets-Sheet 1
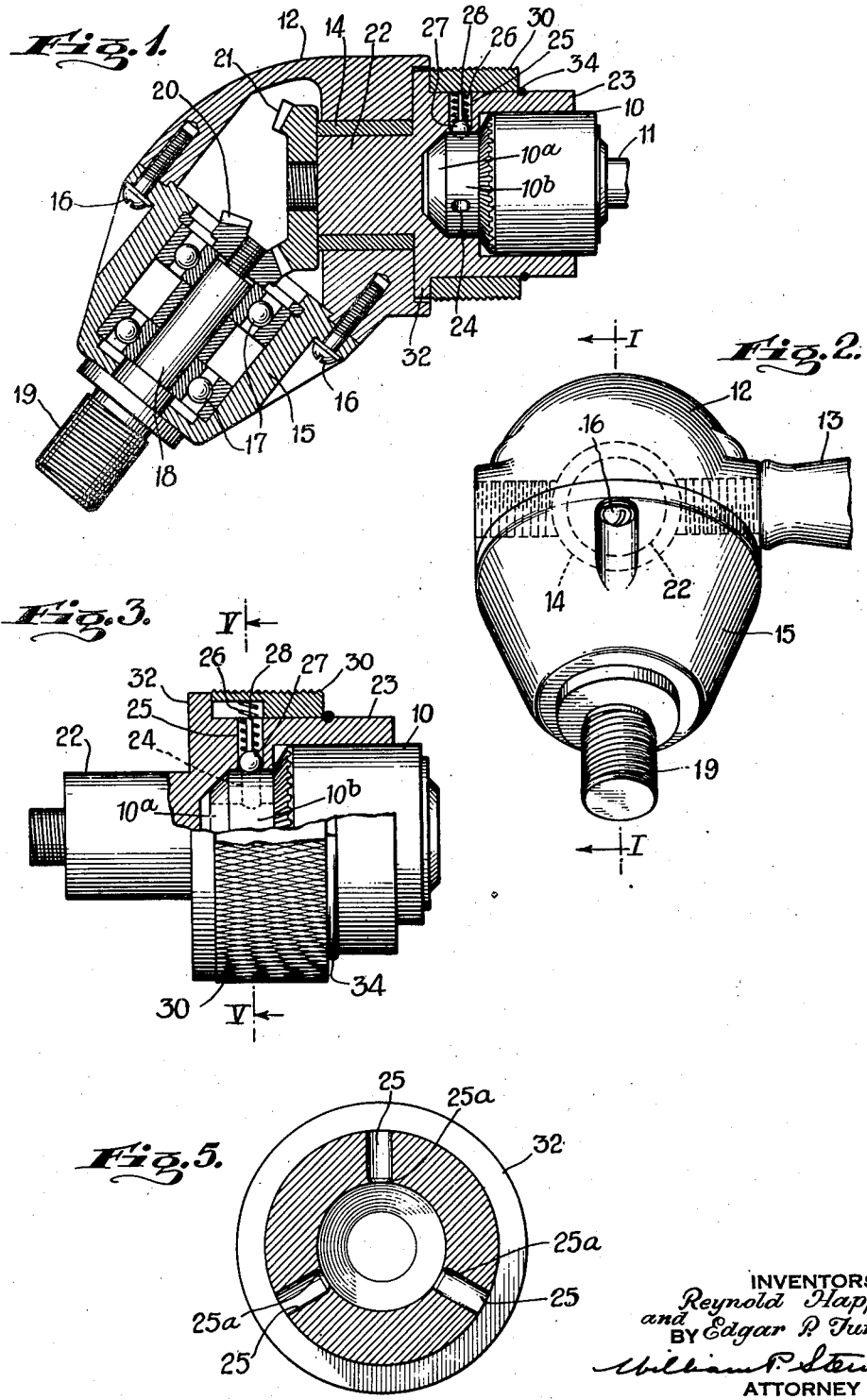
INVENTORS
Reynold Happe
and Edgar P. Turner
BY
William P. Stewart
ATTORNEY March 22, 1949. R. HAPPE ET AL 2,465,309
CHUCK ADAPTER FOR PORTABLE ELECTRIC TOOLS
Filed June 1, 1944 2 Sheets-Sheet 2
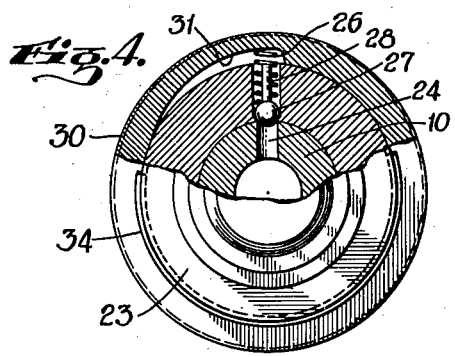
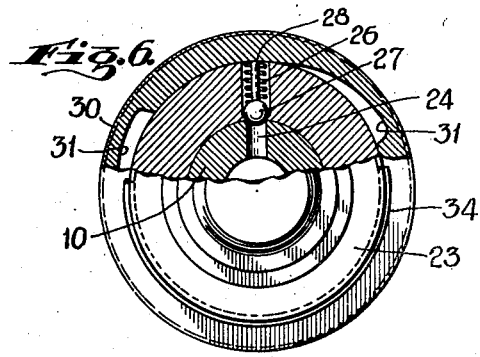
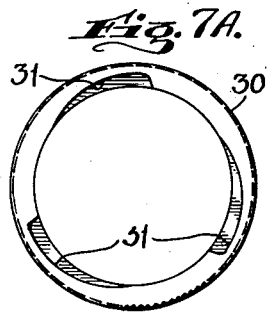
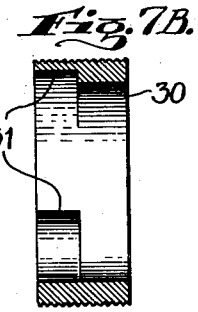
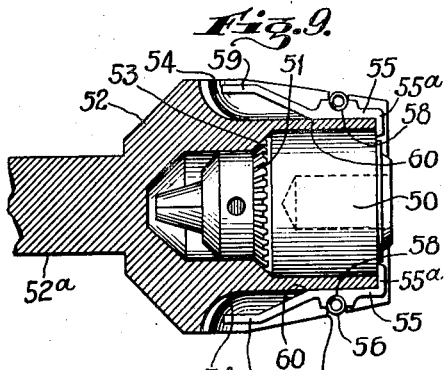
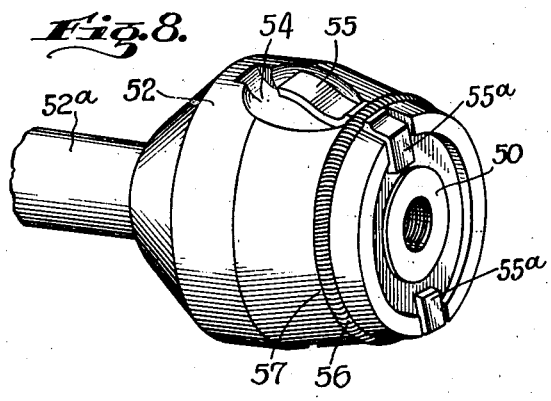
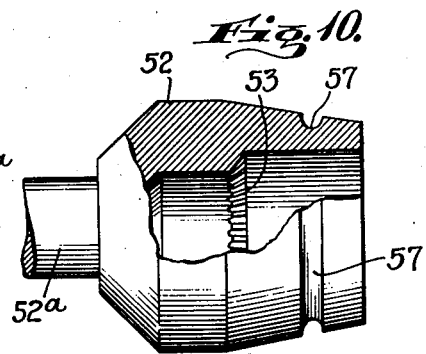
INVENTORS
Reynold Happe
and Edgar P. Turner
BY William P. Stewart
ATTORNEY Patented Mar. 22, 1949

2,465,309

UNITED STATES PATENT OFFICE 2,465,309

CHUCK ADAPTER FOR PORTABLE ELECTRIC TOOLS

Reynold Happe, Pittstown, and Edgar P. Turner, Fanwood, N. J., assignors to The Singer Manufacturing Company, Elizabeth, N. J., a corporation of New Jersey Application June 1, 1944, Serial No. 538,232

10 Claims. (Cl. 51—170)

This invention relates to a chuck adaptor by means of which it is possible to transmit the motion of the chuck of a portable electric drill, or like machine, to tools at a distance or to other apparatus than that contemplated by the construction of the machine.

The normal portable electric drill is an instrument of small flexibility in its unmodified form. It can be applied to but few uses; in general, only to those uses which contemplate the direct seizure and rotation of the tool by the chuck. Frequently, the position of work which is to be accomplished is such that the straight alignment of tool and motor provided by the ordinary chuck is awkward.

It is an object of this invention to provide a means for transmitting the power of electric hand drills or the like into or around corners and additionally to instruments, such as sanders, grinding wheels, etc., whose operation was not contemplated by the designer of the apparatus.

The objects of the invention are accomplished generally speaking, by fitting to the chuck of an electric hand drill, or the like, an adaptor for converting the motion of the chuck to new uses, with an increase or decrease of speed if desired, and to new locations. Other objects of the invention will be in part apparent and in part set forth in the description which follows.

In the drawings:

Fig. 1 is a cross section through the chuck adaptor on the line I—I of Fig. 2;

Fig. 2 is a plan view of the outside of the adaptor, as seen from the output end;

Fig. 3 is an assembled view, partly in section, showing the preferred form of clutch between the chuck and adaptor;

Fig. 4 is a partial section on the line V—V of Fig. 3;

Fig. 5 is a partial section on the line V—V of Fig. 3, showing the clutch holes in the chuck adaptor.

Fig. 6 is a section on the line V—V of Fig. 3, showing the cam ring turned to locking position.

Fig. 7A is a face view of the locking ring;

Fig. 7B is a vertical cross section through Fig. 7A;

Fig. 8 is a perspective view of a modified form of the invention;

Fig. 9 is a partial section taken vertically through Fig. 8; and

Fig. 10 is a view, partly broken away, showing a portion of the chuck adaptor corresponding to Figs. 8 and 9.

In the preferred form of the invention disclosed in Figs. 1 to 7, 10 is a chuck mounted on the power output shaft 11 of a portable electric drill of which the chuck forms a part. The upper portion of an adaptor housing is shown at 12 having a handle 13 which may be attached to said housing on either side thereof, shown in Fig. 2 to the left looking forward. A bearing 14 is in the upper part of the housing. The lower portion 15 of the housing is united to the upper part by screws 16 and carries bearings 17 for a supplemental power output shaft 18. A threaded portion 19 on the end of the shaft 18 provides an attachment for tools or instruments. A gear 20, fixed to the shaft 18 inside the housing, meshes with the gear 21 attached to a power take-off shaft 22 forming a part of a sleeve-like clutch member 23. A sleeve portion of the clutch element 23 snugly fits the chuck 10, which has holes 24 arranged 120° apart, as shown, although their number and arrangement is variable. In normal use of the drill, the holes 24 receive the end of a chuck-locking key, as is well understood. The clutch element 23 of the adaptor has three holes 25 which are reduced at their inner ends 25a. Located in the holes 25 are balls 27 pressed by springs 26, which surround pins 28 carried by the balls. A manually turnable ring or collar 30, journaled on the element 23, covers the holes 25 and has cam surfaces 31 within its forward portion to act upon the pins 28. The member 23 has a flange 32 against which the collar 30 abuts, and a snap ring 34 fits a groove in the element 23 and holds the collar 30 in position on the adaptor.

The device functions as follows: when the sleeve 23 of the adaptor is slid over the chuck 10, the balls 27 are pushed back in the holes 25 by the inclined forward end 10a of the chuck and ride the reduced portion 10b of the chuck until they find their way to their intended positions in the holes 24, which are of less diameter than the balls. In order that the balls may ride up the inclined end of the chuck and find their way into the holes in the chuck, the ring 30 must first be turned to a position such that the pins 28 can extend into the deepest section of the cam grooves, as shown in Fig. 4. When the balls have been seated in the holes, the ring 30 is turned and the cam faces 31 compress the springs 26 and lock the pins 28 in position, as shown in Fig. 6, to hold the balls in the holes 24. When in the position shown in Fig. 6, the elements 23 and 10 can neither be withdrawn from, nor turned with respect to, each other, and the rotation of the chuck 10 is transmitted to the shaft 22, thence through the gears 21 and 20, to the output shaft 18, and finally to the device mounted on or connected to the element 19. This construction is simple, positive, and greatly increases the range of usefulness of the ordinary portable electric drill.

In the modified form of the invention shown in Figs. 8 to 10, a chuck 50 has gear teeth 51 which mesh with gear teeth 53 in a sleeve-like adaptor body 52 when the apparatus is assembled. Slots 54 in the exterior of the adaptor body 52 contain latches 55 which are held in place by a garter spring 56 seated in the circumferential groove 57 of the adaptor body 52 and in grooves 58 of the latches 55. The latches 55 have downturned ends 55ª which engage behind the chuck 50, elevated ends 59 and fulcrum points 60 so that by applying pressure on the ends 59 the latches may be disengaged from the chuck and the adaptor removed as a unit.

The modified form of the chuck adaptor is assembled as follows: pressure is applied to the ends 59 of the latches and the ends 55ª thereof are raised and the adaptor sleeve 52 is slid over the chuck until the gear teeth 51, 53 are in mesh. The latches are then released and snap into position, as shown in Figs. 8 and 9, and are held in that position by the garter spring 56. The drive to the adaptor is positive and any rotation of the chuck produces a like rotation of the adaptor element 52 and to the power take-off shaft 52ª thereof.

Among the advantages afforded by the improved adaptors shown herein are (a) they provide a sturdy, self-supporting alignment means for the adaptors on the chuck; (b) they are quickly attachable and detachable without the use of keys, wrenches or other tools; (c) they provide a positive rotary drive for the adaptors, as distinguished from a friction drive as when tools or power take-offs are gripped by the jaws of the chuck, thus, by the present adaptors, greater torque may be transmitted without slippage.

The gear arrangement shown in the preferred embodiment of the invention need not necessarily be employed for the transmission of power but a flexible shaft or other suitable means may be employed in place thereof. Other modifications of the invention will become apparent from a consideration of the specification and the appended claims.

The improved adaptors are shown and described herein in connection with the well known "Jacobs" key type drill-chucks, manufactured by The Jacobs Manufacturing Company, Hartford, Connecticut.

As many apparently widely different embodiments of this invention may be made without departing from the spirit and scope thereof, it is to be understood that we do not limit ourselves to the specific embodiments thereof except as defined in the appended claims.

Having thus set forth the nature of the invention, what we claim herein is:

1. Apparatus comprising a rotatable chuck, means to rotate the chuck, a chuck adaptor including a rotatable sleeve fitting over the chuck, means to unite said chuck and adaptor for rotation of said sleeve from said chuck, and means to transmit the rotary motion of the sleeve to a tool; said chuck having therein a plurality of holes, spring-pressed balls in said sleeve adapted to partially enter said holes to effect a driving connection between said chuck and sleeve, and means to lock the balls in driving position comprising pins engaged with the balls and a manually turnable ring having cam faces engaging the pins.

2. Apparatus comprising a rotatable chuck, means to rotate the chuck, a member fitted upon said chuck, means to unite said chuck and member for rotation of said member from the chuck, and means to transmit the rotary motion of the member, the said uniting means comprising gear teeth on the chuck intermeshing with gear teeth on the member, and a snap latch carried by said member and engaging said chuck to hold the teeth in mesh.

3. Apparatus comprising a rotatable chuck, means to rotate the chuck, a chuck adaptor including a rotatable member, means to unite said chuck and adaptor for rotation of said member from said chuck, and means to transmit the rotary motion of said member to a tool; said uniting means comprising interengaging clutch means on the chuck and the adaptor, means to keep the clutch means in engagement comprising latches on one of said members having portions to engage cooperating portions of the other of said members, and a spring surrounding said member and engaging said latches to keep said latches in engaging position.

4. A device of the class described comprising a member adapted to embrace the rotary tool chuck of a portable electric tool, said member affording a power take-off shaft having its axis aligned with the axis of the chuck, a housing in which said member is journaled, quick-detachable spring-pressed means carried by said member and engaging the chuck for securing said member to the chuck for rotation therewith, a tool-driving shaft journaled in said housing with its axis at an obtuse angle to the axis of said power take-off shaft, said tool-driving shaft having means for securing thereto sanding, polishing and similar tools, and a speed multiplying gear connection between said shafts.

5. A sanding and polishing attachment for a portable electric tool having a rotating tool chuck provided with a radial aperture, comprising, a housing, a member journaled in said housing and having a portion embracing said chuck, means including a spring-pressed detent carried by said member and adapted to fit into said aperture to detachably secure the member to the chuck for rotation therewith, a tool-driving spindle journaled in said housing with its axis at an angle of approximately forty-five degrees to the axis of said member, said spindle having means for securing thereto sanding and polishing tools, and a speed-multiplying bevel gear connection between said member and said spindle.

6. A power transmitting adaptor for a power-driven tool having a rotating chuck including cylindrical portions of unequal diameters, the smaller of which is provided with an aperture, comprising a sleeve having a two-diameter bore adapted to embrace both cylindrical portions of said chuck for supporting said sleeve solely upon said chuck, a radially movable locking member carried by said sleeve and adapted to enter the aperture in the chuck for locking the sleeve to the chuck and for rotating the sleeve from the chuck, manually actuated means for maintaining said locking member in said aperture, and a power take-off shaft connected with said sleeve.

7. A power transmitting adaptor for a rotatable tool-chuck having a radially disposed aperture therein, comprising a member embracing said chuck and supported solely thereby and having a rotary power take-off shaft, a locking element carried by said member and constructed and arranged to be fitted into the aperture in said chuck to lock said chuck and member together against relative movement both angularly and axially, and a manually shiftable element carried by said member and adapted to be moved to a position in which it prevents separation of said locking element from said aperture.

8. Apparatus comprising a rotatable chuck, means to rotate the chuck, a chuck adaptor including a housing, a handle on said housing for manually holding said housing against rotation, a rotatable sleeve journaled in said housing, means to unite said chuck and adaptor for rotation of said sleeve from said chuck, and means to transmit the rotary motion of the sleeve to a tool, said means to unite the chuck and the adaptor comprising at least one radial hole in one of them and a complemental spring-pressed element carried by the other and fitting into said hole, and locking means for positively maintaining said spring-pressed element in said hole.

9. Apparatus comprising a rotatable chuck, means to rotate said chuck, a power take-off including a non-rotatable housing, a rotatable sleeve carried by said housing and surrounding said chuck, means to unite said chuck and sleeve for rotation of said sleeve from said chuck, and means including a gear train to transmit the rotary motion of the sleeve; said means to unite them comprising holes in one of said members, spring-pressed retractible means in the other of said members adapted to enter said holes, and cam means for locking the retractible means in operating position.

10. Apparatus comprising a rotatable chuck, means to rotate the chuck, a chuck adaptor including a non-rotatable housing, a rotatable member journaled in said housing and surrounding said chuck and supported solely thereby, interengaging means, carried by the chuck and rotatable member, adapted to transmit torque from the chuck to the rotatable member and prevent separation of the chuck and rotatable member, said means including a spring pressed member carried by one of the chuck and member parts, and means journaled in said housing to transmit the rotary motion of said member; said interengaging means being releasable to permit removal of said member from said chuck.

REYNOLD HAPPE.
EDGAR P. TURNER.

REFERENCES CITED

The following references are of record in the file of this patent:

UNITED STATES PATENTS

| Number | Name | Date |
| --- | --- | --- |
| 666,507 | Furbish | Jan. 22, 1901 |
| 950,759 | Weiner | Mar. 1, 1910 |
| 1,112,730 | Trivers et al. | Oct. 6, 1914 |
| 1,550,712 | Smith | Aug. 25, 1925 |
| 1,575,953 | Toorks | Mar. 9, 1926 |
| 1,631,491 | Klein | June 7, 1927 |
| 1,678,124 | Perreault | July 24, 1928 |
| 2,291,729 | Koett | Aug. 4, 1942 |
| 2,348,266 | Selby | May 9, 1944 |
| 2,395,534 | Cook | Feb. 26, 1946 |